(12) United States Patent
Pierce et al.

(10) Patent No.: US 6,237,695 B1
(45) Date of Patent: *May 29, 2001

(54) DETHATCHER APPARATUS

(76) Inventors: Kevin J. Pierce, 6473 E. Lake Dr.;
Michael J. Pierce, 6373 E. Lake Dr.,
both of Grand Forks, ND (US) 58201

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,819

(22) Filed: Apr. 28, 1999

Related U.S. Application Data

(60) Provisional application No. 60/098,727, filed on Sep. 1, 1998.

(51) Int. Cl.$^7$ .................................................. A01D 77/00
(52) U.S. Cl. ................................ 172/79; 56/16.7; 56/364
(58) Field of Search ........................... 172/79, 620, 621,
172/622; 56/396, 398, 400, 400.02, 16.7,
16.9, 364, 372, 370, 366

(56) References Cited

U.S. PATENT DOCUMENTS

| | | | |
|---|---|---|---|
| 2,881,580 | * 4/1959 | Ashton | 56/364 |
| 2,992,525 | * 7/1961 | Irish | 56/372 |
| 3,512,345 | * 5/1970 | Smith | 56/364 X |
| 3,859,777 | * 1/1975 | Doering | 56/16.7 |
| 5,014,504 | * 5/1991 | Oechsle | 56/372 |
| 5,042,243 | * 8/1991 | Doering | 56/400 |
| 5,524,425 | * 6/1996 | Gallazzini | 56/364 |

* cited by examiner

Primary Examiner—Robert E. Pezzuto
(74) Attorney, Agent, or Firm—Robert E. Kleve

(57) ABSTRACT

The invention comprises a mobile dethatching or ground cutting apparatus having a frame with front and rear wheels and a towing arm mounted to the frame for towing behind a tractor. A rotary drum is rotatably mounted to the frame and a hydraulic motor is mounted to the frame for powering the rotation of the drum. The front wheels are adjustable in height for adjusting the weight of the drum relative to the ground. The drum has a plurality of slots and peripheral rods are mounted about the circumference of the drum with the drum having plurality of slots at intervals about its circumference rod receiving. A plurality of harrow teeth have coil spring portions slidably and detachably mounted to the rods of the drum and a projecting portion detachably received in the slots of the drum so as to project the harrow teeth outward from the drum for engaging the ground as the device is moved forward along the ground with the drum power rotated for the harrow teeth to cut a path in the ground with the drum and teeth adjustable by the front wheels for varying the depth of the teeth or thinning or cutting a strip or path in the ground.

4 Claims, 5 Drawing Sheets

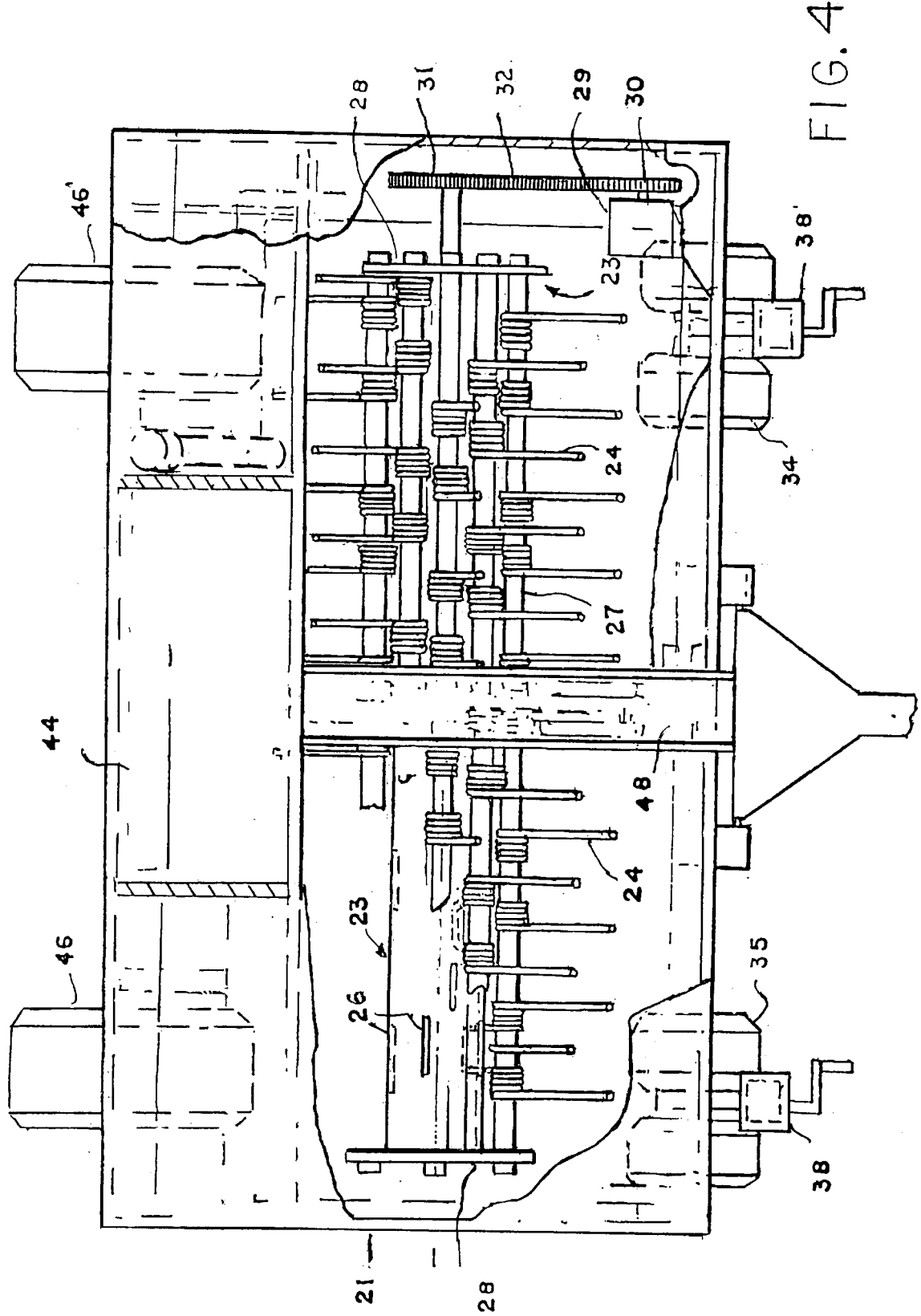

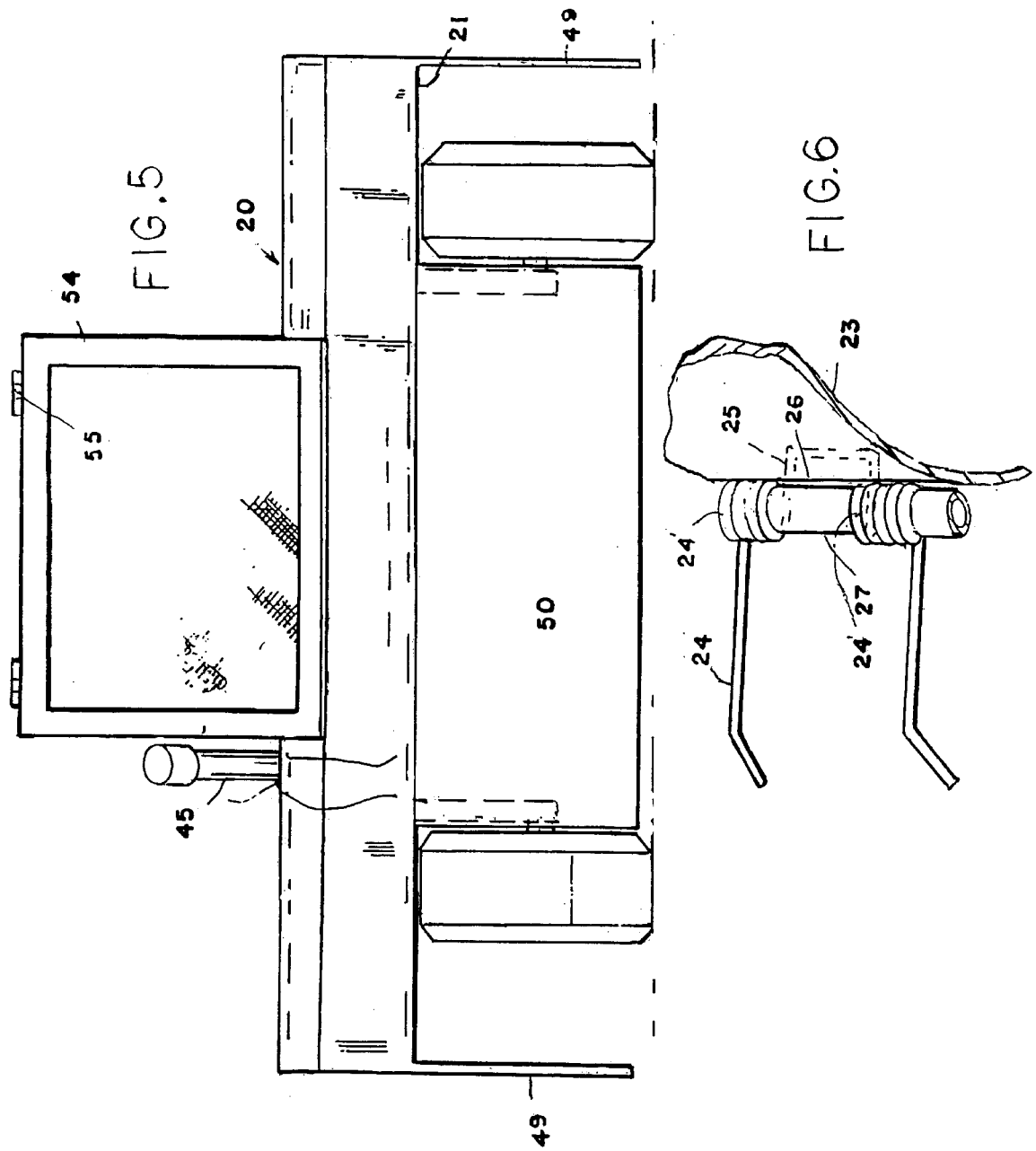

DETHATCHER APPARATUS

This application is a continuation-in-part of Provisional application Ser. No. 06/098,727, filed Sep. 1, 1998.

This invention relates to harrowing de thatching or ground stripping apparatus, more particularly, the invention relates to digging, cutting a path in, and pulverizing of earthen materials.

It is an object of the invention to provide a novel ground working apparatus which can has a drum with a plurality of spring teeth mounted at intervals about the drum for engaging the ground and cutting a path in the ground or material.

It is another object of the invention to provide a novel dethatching device which has a hydraulic power driven drum with a plurality of teeth mounted on the drum with a hydraulic reservoir and hydraulic motor mounted on the device fluid for powering the hydraulic motor of the device.

It is a further object of the invention to provide a mobile device with a power driven drum having a plurality of harrow teeth mounted at intervals about the drum with the drum rotating at a selected speed and with the device be adjustable to a selected height to place the drum and teeth at selected height to cut a path in the ground at a selected depth with teeth.

Further objects and advantages of the invention will become apparent as the description proceeds and when taken in conjunction with the accompanying drawings wherein:

BRIEF DESCRIPTION OF THE DRAWINGS

FIG. 4 is a top cutaway view of the ground cutting apparatus similar to FIG. 3.

FIG. 5 is rear elevational view of the dethatching apparatus.

FIG. 6 is a fragmentary perspective view of the drum illustrating the teeth mounted in slots in drum.

BRIEF DESCRIPTION OF PREFERRED EMBODIMENT

Briefly stated the invention comprises a six wheel dethatching or ground stripping apparatus having a power drive rotating drum with teeth having the one ends mounted in slots in the drum and extending radially outward and adapted to being rotated by the drum for engaging the ground. A dual pair of wheels are mounted to the front and a pair of wheels are mounted to the rear of the apparatus with the front wheels each front pair having a telescoping shaft which can be telescoped or retract by a crank for changing the height of the wheels and thereby changing the height of the teeth and drum relative to the ground for changing the depth of the cut of the teeth when rotating and when the device is being drawn across a field.

Figure 1:
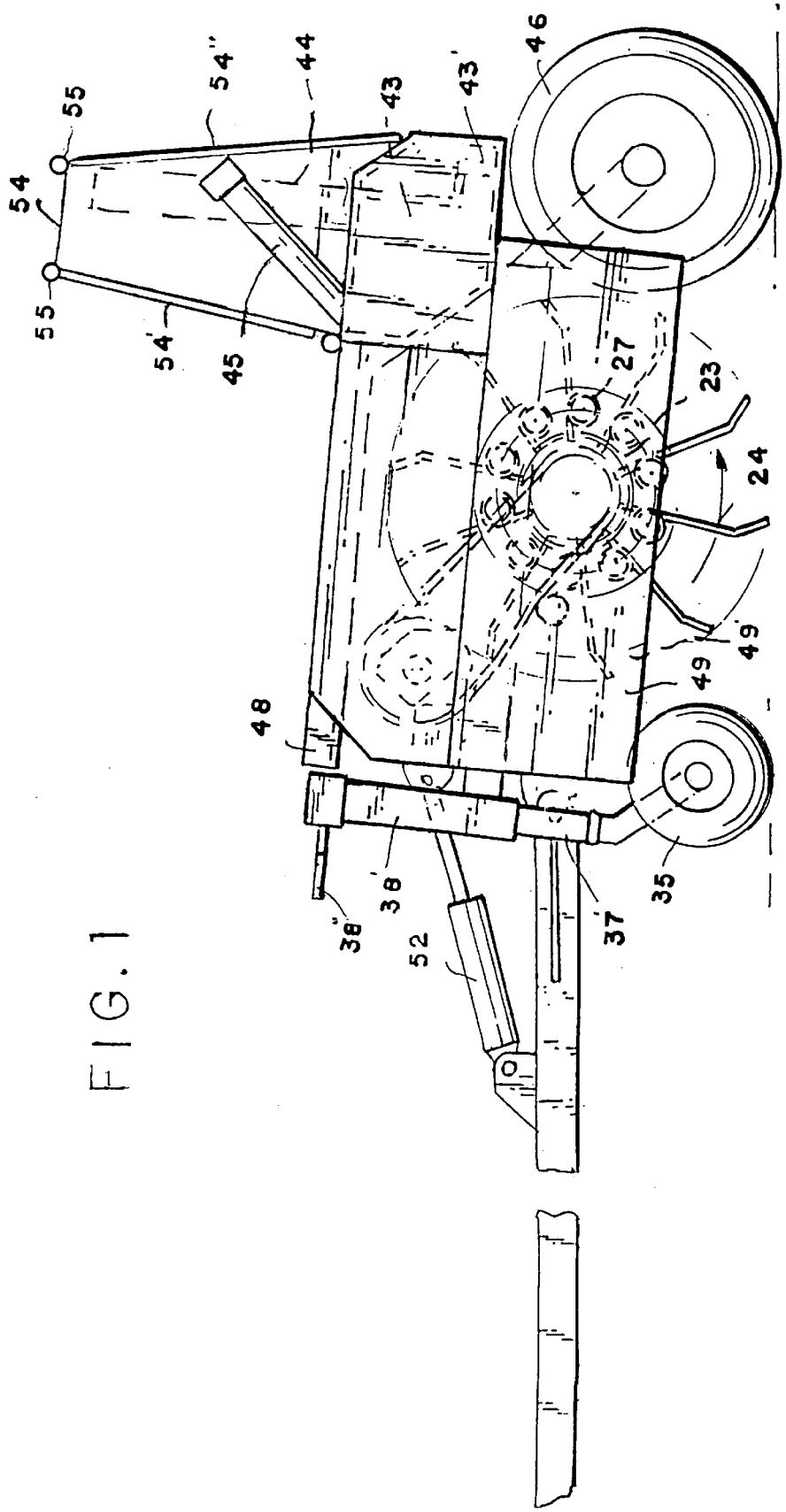
FIG. 1 is a side elevational view of the ground cutting, stripping and pulverizing or dethatching apparatus showing the rotating drum with the plurality of tines mounted in the drum at intervals about the circumference of the drum for engaging the ground and cutting into the plants on top of the ground.
Figure 2:
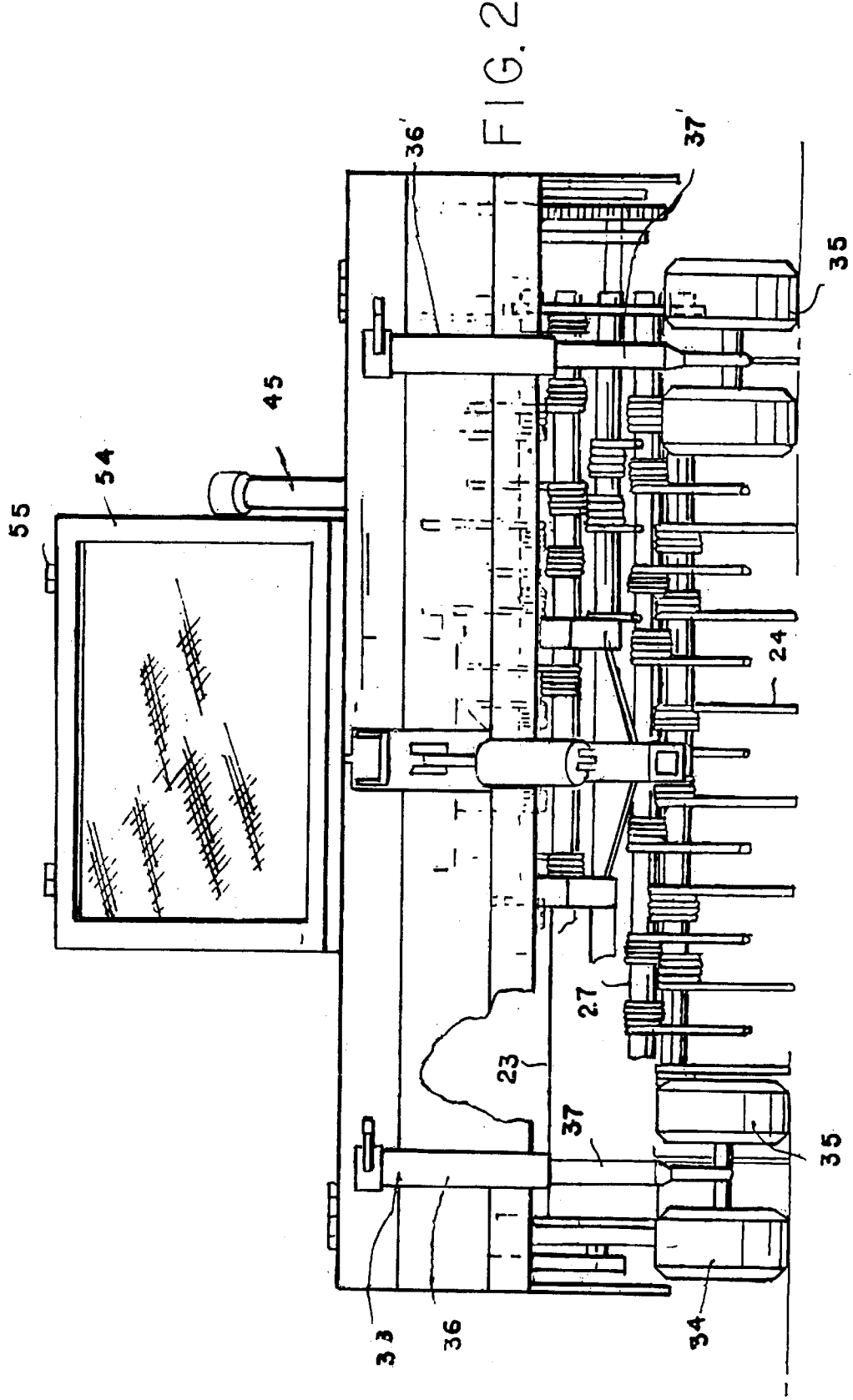
FIG. 2 is a front elevational view of the ground cutting or engaging dethatching apparatus.
Figure 3:
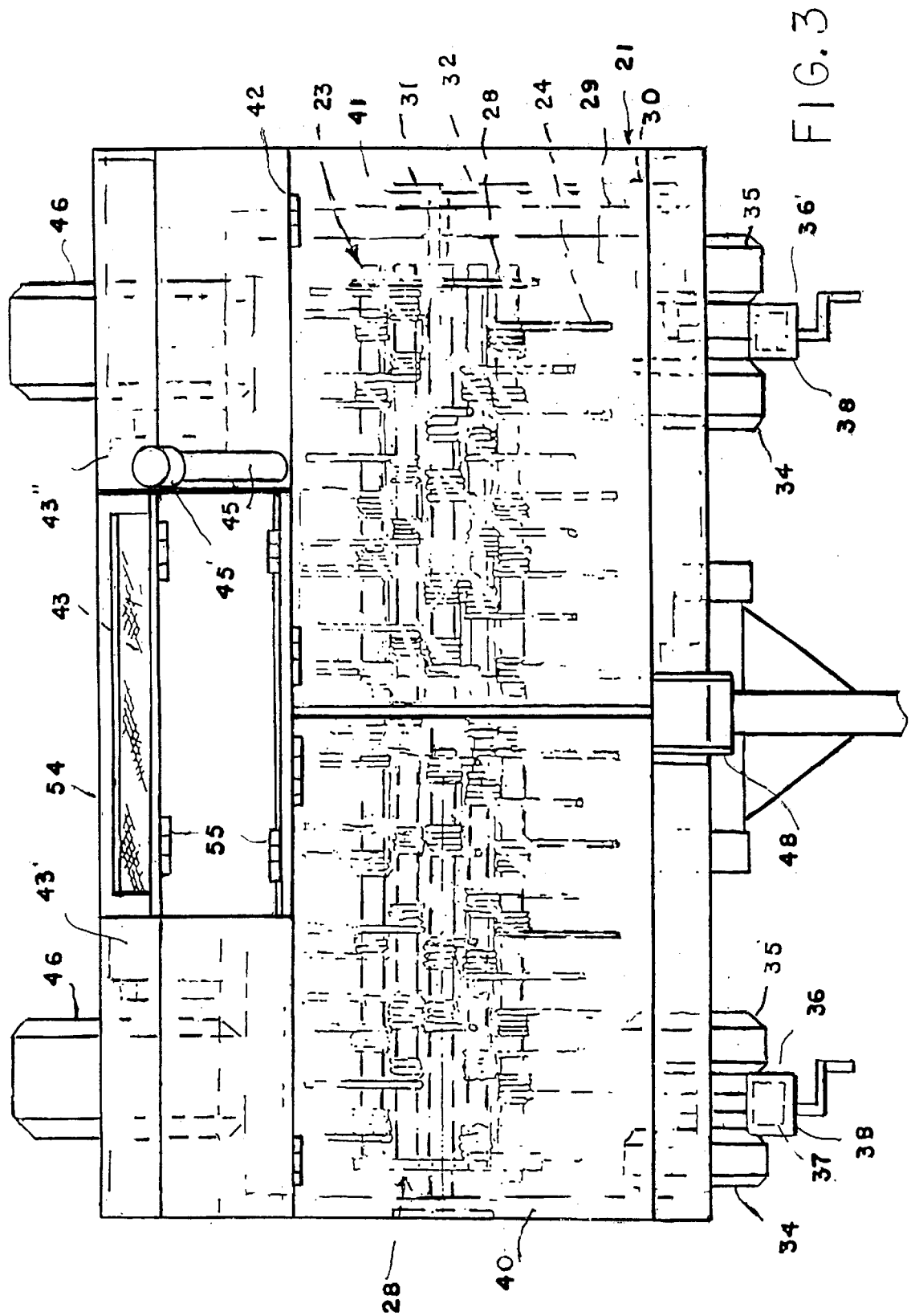
FIG. 3 is a top view of the ground engaging apparatus.

Referring more particularly to the drawings in FIGS. 1–4 the power driven harrow teeth mobile dethatching or ground cutting apparatus 20 is illustrated having frame 21 with a pair of rear wheels 22 and 22' rotatably mounted to the rear of the frame 21. A drum 23 is rotatably mounted to the frame 21 and a plurality of pairs of harrow teeth 24 each have end portions 24' and 24" forming harrow teeth, with a spiral ring portion 24''' of each of the pair of teeth and an intermediate bent portion 25. The drum has a plurality of tubes 27 and end plates 28 and 28', with the end plates are fixed to the opposite ends of the drum with the tubes 27 slidably mounted in circumferential bores in the ends plates at intervals about the drum. The spiral ring portions 24''' of each of the pair of teeth are slidably mounted over the tubes 27 of the drum with the intermediate bent portion 25 inserted in slots 26 in the drum and with a spiral ring portion 24' of each pair of teeth 24 are slidably mounted over tubes 27 which tubes are mounted in end plates 28 and 28 and are spaced around the drum. Pins are provided which are detachably inserted into bores in both ends of the tubes, outside of the end plates, to hold the tubes in between the ends plates about the drum. The removal of the pins enables the tubes to be slid out of the end plates with the harrow teeth being slidable off the tubes on the spiral ring portions and being slidably removable from the slots in the drums for quick removal of the teeth from the drum apparatus. Shafts 23' are fixed to the center of each end plate 28 and 28' and extend axially outward and are rotatably mounted to depending frame portions 21' at each side of the frame to rotatably mount the drum 23 to the frame 21. The end plates 28 and 28' are fixed to the ends of the drum 23, so that the tubes are located at intervals about the drum to thereby place the harrow teeth 24 at intervals about the drum. A fluid or hydraulic motor 29 is mounted to the frame 21 and gears 30 and 31 are mounted to the output shaft of the motor 29 and to the center 31' of one of the end plates 28 of the drum with an endless chain 32 connecting the gears 30 and 31 together so that powering the motor 29 with rotate gear 30 which rotates the chain and the chain rotates the gear 31 to thereby rotate the drum 23 with the drum rotating the harrow teeth which will engage the ground to cut a path in the ground. An idler gear 32 is rotatably mounted to the frame to engage the chain to cut it in a taut position as shown for positive engagement with the chain to the gears for a positive driving of the drum by the motor.

The harrow teeth are not bolted to the drum and may be replaced by sliding the tubes out of the spiral ring portions of the harrow teeth and out of the a bores in the end plates and new harrow teeth slid onto the tubes with the intermediate bent portion replaced in the appropriate slots of the drum and the tubes slid back in the bores of the end plates of the drum. The harrow teeth are not in front to rear alignment but are staggered at an angle about the drum to provide better coverage of the teeth cutting action in the ground.

A dual pair of front wheels 34 and 35 are adjustably mounted in height upon the front of the frame 21 of the device 20. The frame 21 has a pair of screw type crank operated jack mechanisms 36 and 36' mounted to the front of the frame and connected to each pair of front wheels 34 and 35. Each of the pair of front wheels 34 and 35 have a center post 37 which the wheels 34 and 34' with screws at their upper ends which are rotatably mounted in the smaller square sleeves 37 and 37', which are telescoped into the larger square sleeves 38 and 38' and the rotation of their cranks 38" which are rotatably mounted to the upper square sleeves rotates the screws which telescoped or retracts the lower square sleeve into the upper larger sleeve to raise or lower the wheels 34 and 35 relative to the frame and the drum, depending upon the direction of rotation, to raise or lower the front of the frame 21 and thereby raise or lower the drum and its teeth relative to the ground change the depth of the cut of the teeth into the ground when the drum is rotated and the device is being towed along the ground. The device also has the pair of rear wheels 46 and 46' mounted to the rear of the frame 21 of the device. A pivotally mounted towing rod or arm 47 is pivotally mounted at pivot point 47' to the front of the frame of the device for towing the device behind a tractor.

A pair of covers 40 and 41 each are pivotally mounted at their rear ends by hinges 42 to the frame 21 to pivot open to allow direct access to the drum and the harrow teeth mounted on the drum as well as the power drive to the drum.

A fluid reservoir compartment 43 is formed at the back of the frame 21 of the device 20 to provide fluid for pumping by the hydraulic pump (not shown) mounted typically on the tractor for towing the device 20. The reservoir has to relatively large compartment portions 43' and 43" on each side and a shallow center compartment portion 43"' communicating with one another in fluid communication to form the overall compartment and in communication with the filler tube 45. The hydraulic pump will be powered by a power take off on the tractor and the pump will circulate the fluid from the reservoir through line 44' to the hydraulic motor 29 on the device to power the hydraulic motor 29 and the fluid circulates from the motor back through line 44" to one or a pair of radiators 44, depending upon the cooling needs and which radiators are mounted to the frame 21 of the device above the compartment 43; and from the radiators, the fluid circulates back into the reservoir. The powering of the hydraulic motor 29 drives the chain 31 which rotates the drum 23 and thereby rotates the teeth on the drum 23. The radiator has a fan which is also powered hydraulically to and the radiator cools the hydraulic fluid from the reservoir. The filler tube 45 is fixed to the top of the reservoir compartment and extends down into fluid communication with the compartment 43 to provide access to the interior of the compartment for filling the compartment with hydraulic fluid. A A removable cap 45' is detachably mounted over the top of the filler tube.

A channel member 48 is fixed to the middle of the frame above the drum and teeth of the drum and provides a channel for the hydraulic hoses connected to the reservoir and radiator to run forward to the pump on the tractor. A pair of flexible curtains 49 and 49' are mounted at their tops to the frame 21 and extend freely downward therefrom to act to prevent the dirt stirred up by the rotation of the teeth 24 into the ground from being thrown about and away from the apparatus as it operates. A similar rear curtain 50 is mounted at its top to the rear of the frame and extends downward to act similarly to keep the dirt from flying about and away from the apparatus as it operates.

A hydraulic piston and cylinder 52 is mounted between the towing arm and frame and is hydraulically powered by the tractor. The piston and cylinder 52 has a one way telescoping power action to raise the front wheels and teeth of the drum off the ground for transporting the apparatus from place to place; and a free floating position wherein there is no fluid pressuring the piston in either direction in the cylinder and the piston is free to move in either direction to adjust the angle of the towing arm relative to the frame so that the front wheels remain rolling on the ground and the teeth remain engaging in the ground to the depth determined by the jack mechanisms for the front wheels as adjusted by the cranks 38'.

The device 20, when operated, will be towed behind a tractor to cut a path through the grass of a of a golf green, for example, with the motor powering the drum to rotate the drum to rotate at approximately 600–1200 RPM. This device will power a path through the grass in one pass, which in other devices may require several passes to provide the same completeness and thoroughness of the cut in the grass. The pump will be powered while the tractor is towing the device behind the tractor and through hydraulic line 44' will pump the fluid from the reservoir 43 to the motor 29 to power the motor and the fluid will travel from the motor 29 back through the radiators 44 and from the radiators back to the reservoir.

The radiators 44 are mounted in a radiator housing 53 which housing is mounted to the top of the reservoir compartment 43. The radiator housing 53 has a main frame 54 and a pair of screen panels 54' and 54" pivotally mounted to the top of the radiator housing by hinges 55 to the front and to the rear of the radiator housing 54 so that they may swing open to the front and to the rear of the housing to provide access to the radiators therein. The screens 56 of the panels 54' and 54" allow air to enter into the radiators through the screens of the panels to provide more effective cooling by the radiator.

Thus it will be seen that a novel dethatching device has been provided having a power drive height adjustable drum with teeth on the drum and with a reservoir to provide fluid for powering the hydraulic motor to drive the drum and with a radiator on the device to provide cooling for the fluid in the reservoir.

The device may operate to power rotate the drum to cause the teeth to cut into the ground for a inch or less if desired for thinning the grass and for digging out the dead grass that sometimes builds up on the ground which will prevent effective reseeding of the ground by the thick layer of dead grass preventing new grass seeds from reaching the ground when spread onto the ground. The device will thin out the dead grass or mulch to clear a path to the ground so that the seed can reach the ground. The drum may be lowered to path the teeth deeper in the ground several inches for more completely harrowing the grass out of the ground, if desired.

Once the dead grass has been dug out by the power harrowing operation, then a vacuum apparatus may be used to pick up the dead grass or mulch and the live grass that has been thinned out to create an adequate seed bed preparation. Then, an overseeder may be used to reseed the ground that has been treated with this operation. This enables the new grass to grow quicker as it can more readily reach the ground and will not be blocked from reaching the ground to the extent it may have been by the layers of dead grass on the ground.

It will be obvious that various changes and departures may be made to the invention without departing from the spirit and scope thereof; and accordingly, it is not intended that the invention be limited to that specifically described in the specification or as illustrated in the drawings, but only as set forth in the appended claims wherein:

What is claimed is:

1. A harrow teeth drum dethatching apparatus comprising a towable frame for towing behind a motorized vehicle with pump means on said motorized vehicle, wheels mounted on said frame for rotatably supporting said frame for towing along the ground;

said towable frame having a rotatable cylindrical drum, a fluid motor for rotating said drum, a fluid reservoir, radiator, and a fluid powered fan mounted thereon for cooling said fluid in said radiator;

power transmission means for transmitting fluid from said reservoir to said pump on said motorized vehicle with said transmitting means transmitting fluid from said pump through said fluid motor on said towable frame to power said motor for rotating said drum on said frame and through said radiator for cooling said fluid;

harrow teeth mounted circumferentially on and about said drum to rotate circumferentially with said drum, with said rotating teeth acting to cut a path in the ground as the apparatus is towed along the ground.

2. A harrow teeth drum dethatching apparatus comprising a mobile frame, wheels mounted on said frame for rotatably supporting said frame on the ground as it rolls along the ground, a cylindrical drum rotatably mounted on said frame, a plurality of harrow teeth each formed in pairs by a harrow rod, said harrow rods each having a pair of coiled portions adjacent each tooth and a projecting center portion, a plurality of support rods mounted to said drum in spaced parallel relation to the drum in a circumferential cylindrical path about said cylindrical drum, said drum having a plurality of slots in its cylindrical circumference, said pairs of harrow teeth each being detachably mounted to said drum with said projecting center portions of said harrow rods slidably and detachably received in said slots of said drum and said coiled portions detachably mounted on said support rods in a cylindrical path entirely about said drum, means for powering said drum to rotate said drum and thereby rotate said harrow teeth in a cylindrical path about said drum to enable said teeth to engage and cut into the ground.

3. A harrow teeth apparatus for supporting a plurality of harrow teeth comprising a mobile frame, wheels mounted on said frame for rotatably supporting said frame on the ground as it rolls along the ground, a harrow teeth frame comprising one elongated frame member having a plurality of slots along its length, a plurality of elongated support rods, a pair of end frame members at each end of said one elongated frame member and having a plurality of aligned bores aligned from end to end for detachably receiving said elongated support rods therein with said support rods in parallel spaced relation to one another and parallel to said one elongated support frame along its length, said harrow teeth each forming a pair of harrow teeth formed of a single rod with the harrow teeth at each end of the rod and having a pair of coiled portions adjacent each tooth and a projecting center portion, each pair of harrow teeth being detachably mounted to said elongated support rods with said coiled portions detachably mounted on said rods, with said projecting center portion detachably received in said slots of said one elongated frame member, to thereby detachably mount said harrow teeth to said frame apparatus at intervals along the length of said one elongated frame member.

4. A harrow teeth apparatus according to claim 3, wherein said one elongated frame member is cylindrical in shape, said slots in said frame member are spaced circumferentially about its cylindrical shape, and said support rods are positioned circumferentially spaced about said cylindrical shape.

* * * * *